(12) United States Patent
Xu et al.

(10) Patent No.: US 11,508,201 B2
(45) Date of Patent: Nov. 22, 2022

(54) BUCKET AND VENDING MACHINE

(71) Applicant: Shandong New Beiyang Information Technology Co., Ltd., Shandong (CN)

(72) Inventors: Fengbo Xu, Shandong (CN); Kai Liu, Shandong (CN); Jiabo Xu, Shandong (CN); Junchao Yuan, Shandong (CN)

(73) Assignee: Shandong New Beiyang Information Technology Co., Ltd., Shandong (CN)

( * ) Notice: Subject to any disclaimer, the term of this patent is extended or adjusted under 35 U.S.C. 154(b) by 289 days.

(21) Appl. No.: 16/957,649

(22) PCT Filed: Sep. 21, 2018

(86) PCT No.: PCT/CN2018/107068
§ 371 (c)(1),
(2) Date: Jun. 24, 2020

(87) PCT Pub. No.: WO2019/128336
PCT Pub. Date: Jul. 4, 2019

(65) Prior Publication Data
US 2021/0065493 A1 Mar. 4, 2021

(30) Foreign Application Priority Data
Dec. 29, 2017 (CN) .......................... 201711470276.6

(51) Int. Cl.
G07F 11/02 (2006.01)
G07F 11/42 (2006.01)
F16H 1/20 (2006.01)

(52) U.S. Cl.
CPC .............. *G07F 11/02* (2013.01); *G07F 11/42* (2013.01); *F16H 1/20* (2013.01)

(58) Field of Classification Search
CPC ...... G07F 11/02; G07F 11/42; G07F 11/1653; F16H 1/20
See application file for complete search history.

(56) References Cited

U.S. PATENT DOCUMENTS

| | | | |
|---|---|---|---|
| 6,520,604 B1* | 2/2003 | Yasaka | G07F 11/42 312/61 |
| 7,327,267 B2* | 2/2008 | Tsunoda | G07F 11/58 340/572.1 |

(Continued)

FOREIGN PATENT DOCUMENTS

| | | |
|---|---|---|
| CN | 103098103 A | 5/2013 |
| CN | 103119633 A | 5/2013 |

(Continued)

OTHER PUBLICATIONS

International Search Report dated Dec. 26, 2018, in the International Application No. PCT/CN2018/107068. 4 pages.

*Primary Examiner* — Gene O Crawford
*Assistant Examiner* — Kelvin L Randall, Jr.
(74) *Attorney, Agent, or Firm* — Wilmer Cutler Pickering Hale and Dorr LLP

(57) ABSTRACT

Disclosed is a bucket applied in a vending machine, including a bucket body, a first driving mechanism and a second driving mechanism. The bucket body includes an inner cavity and two ports in communication with the inner cavity respectively. The two ports are arranged at an interval in a first preset direction. The first driving mechanism and the second driving mechanism are arranged at an interval in the bucket body in a second preset direction, and are respectively configured to detachably mate with a dispensing assembly of a storage column of the vending machine, to provide power to the dispensing assembly. Also disclosed is a vending machine including multiple storage columns and the aforementioned bucket.

13 Claims, 4 Drawing Sheets

(56) References Cited

U.S. PATENT DOCUMENTS

| | | | | |
|---|---|---|---|---|
| 7,686,185 B2* | 3/2010 | Zychinski | ............... | G07F 11/42 |
| | | | | 221/280 |
| 11,043,061 B2* | 6/2021 | Vazquez | ............... | G07F 11/165 |
| 2003/0201275 A1* | 10/2003 | Tamura | ............... | G07F 11/1653 |
| | | | | 221/123 |
| 2005/0189364 A1* | 9/2005 | Herzog | ............... | G07F 11/1653 |
| | | | | 221/1 |
| 2005/0284880 A1* | 12/2005 | Kenmochi | ............... | G07F 11/58 |
| | | | | 221/279 |
| 2006/0261080 A1 | 11/2006 | Matsumoto et al. | | |
| 2020/0043272 A1* | 2/2020 | Vazquez | ............... | G07F 11/1653 |

FOREIGN PATENT DOCUMENTS

| | | |
|---|---|---|
| CN | 106327679 A | 1/2017 |
| CN | 106327691 A | 1/2017 |
| CN | 207924803 U | 9/2018 |
| JP | 4263858 B2 * | 5/2009 |
| WO | WO-2004/108583 A2 | 12/2004 |

\* cited by examiner

BUCKET AND VENDING MACHINE

CROSS REFERENCE TO RELATED APPLICATIONS

This application is a national stage application of co-pending International Patent Application No. PCT/CN2018/107068 filed on Sep. 21, 2018, which claims priority to Chinese Patent Application No. 201711470276.6, which was filed with the State Intellectual Property Office of the People's Republic of China on Dec. 29, 2017, the disclosures of both of are incorporated herein by reference in their entireties.

TECHNICAL FIELD

The present disclosure relates to the field of vending equipment, such as a bucket and a vending machine.

BACKGROUND

The Vending Machine (VEM) is a machine that can automatically deliver the commodity according to the cash put in. The vending machine is common for commercial automation. The vending machine is not limited by time or place, and it can save manpower and facilitate transactions.

The bucket of the related vending machine is generally equipped with a driving mechanism. When the bucket is opposite to the set storage column, the driving mechanism is in transmission connection with the dispensing assembly of the storage column, and the dispensing assembly pushes the commodity in the storage column into the bucket. However, the internal space of the vending machine is generally wasted due to the structural constraint of the related bucket.

SUMMARY

The present disclosure claims a bucket with good efficiency for saving the internal space of vending machine.

The present disclosure further claims a vending machine to fully use its internal space for improving the storage and conveying capacity.

In an embodiment, the present disclosure claims a bucket for vending machine, including a bucket body, a first driving mechanism and a second driving mechanism. The bucket body includes an inner cavity and two ports in communication with the inner cavity respectively; two ports are arranged at an interval in a first preset direction; the first driving mechanism and the second driving mechanism are spaced apart from each other in the bucket body in a second preset direction, and are respectively configured to detachably mate with the dispensing assembly of a storage column of the vending machine, to provide power to the dispensing assembly; where the first preset direction and the second preset direction are arranged with an included angle.

In an embodiment, the present disclosure further claims a vending machine including multiple storage columns and the above-mentioned bucket; among the two ports of the bucket, the one close to the storage columns in the first preset direction is an inlet; the inlet is arranged to be opposite to any one of the storage columns by the movement of the bucket, so that the first driving mechanism or the second driving mechanism of the bucket is configured as being coupled with the dispensing assembly of the storage column that the inlet is opposite to, providing power to the dispensing assembly.

In the figure: 100—first driving mechanism; 101—first detecting mechanism; 102—second driving mechanism; 103—second detecting mechanism; 110—base; 112—base plate; 113—mounting hole; 114—vertical plate; 116—mounting table; 120—motor; 130—transmission mechanism; 131—intermediate transmission assembly; 132—first rotating shaft; 134—intermediate transmission wheel; 136—motor output wheel; 138—speed reducer; 140—power output wheel; 142—second rotating shaft; 150—swing member; 160—position detecting mechanism; 170—one-way transmission assembly; 180—elastic member; 190—first preset rotating direction; 192—second preset rotating direction; 200—bucket; 210—bucket body; 212—inner cavity; 220—port; 230—first preset direction; 240—second preset direction; 250—included angle; 300—vending machine; 310—cabinet; 320—storage column.

DETAILED DESCRIPTION

Figure 1:
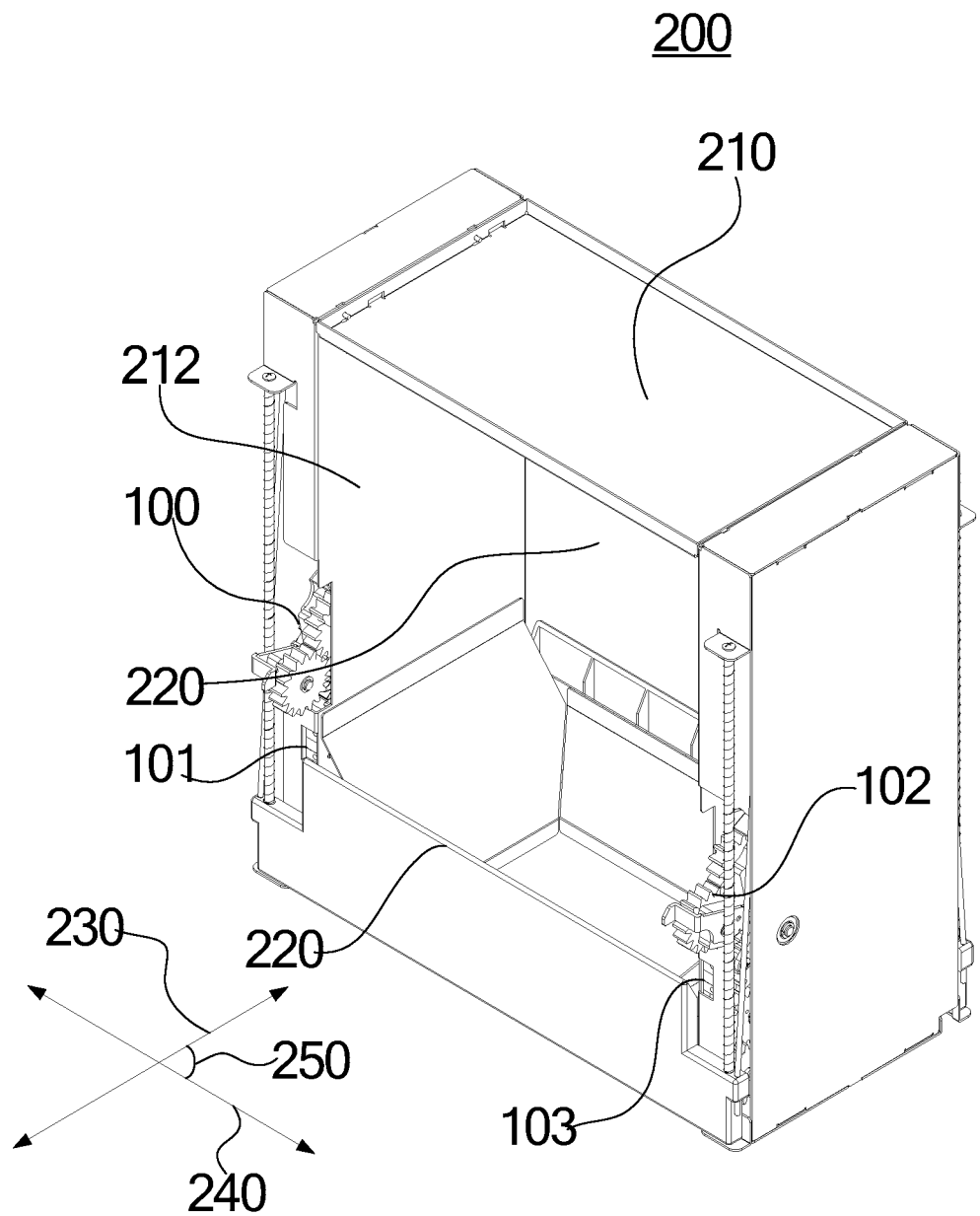
FIG. 1 is a structural view of a bucket according to an embodiment of the present disclosure.

FIG. 1 is a structural diagram of a bucket 200 according to an embodiment of the present disclosure; as shown in FIG. 1, the embodiment provides a bucket 200 for storing and conveying commodity. The bucket 200 includes a bucket body 210, a first driving mechanism 100 and a second driving mechanism 102.

The bucket body 210 has a frame structure and is roughly rectangular. The bucket body 210 includes an inner cavity 212 and two ports 220 in communication with the inner cavity 212 respectively; the two ports 220 are arranged at an interval in a first preset direction 230. The first driving mechanism 100 and the second driving mechanism 102 are arranged at an interval in the bucket body 210 in a second preset direction 240, and are respectively configured to detachably mate with a dispensing assembly of the storage column 320 of the vending machine, to provide power to the dispensing assembly; the first preset direction 230 and the second preset direction 240 are arranged with an included angle 250.

In an embodiment, the first preset direction 230 is vertical to the second preset direction 240.

In an embodiment, the first driving mechanism 100 and the second driving mechanism 102 can be arranged on two opposite side walls of the bucket body 210 in the second preset direction 240, or arranged on side walls adjacent to the storage column 320 of the bucket body 210.

Figure 2:
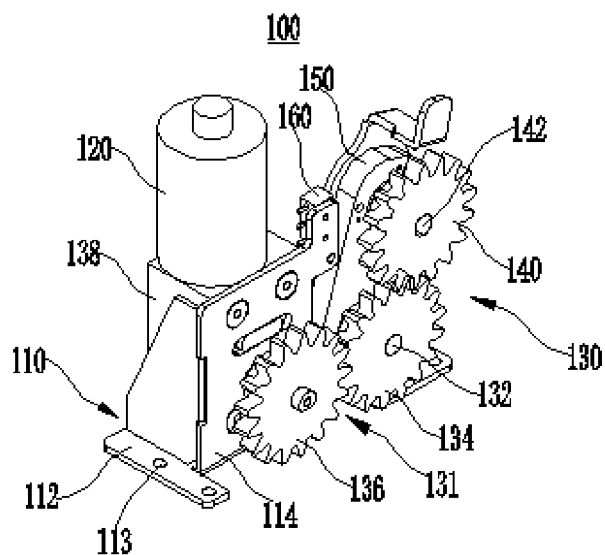
FIG. 2 is a structural view of a first driving mechanism of a bucket from a first angle of view according to an embodiment of the present disclosure.
Figure 3:
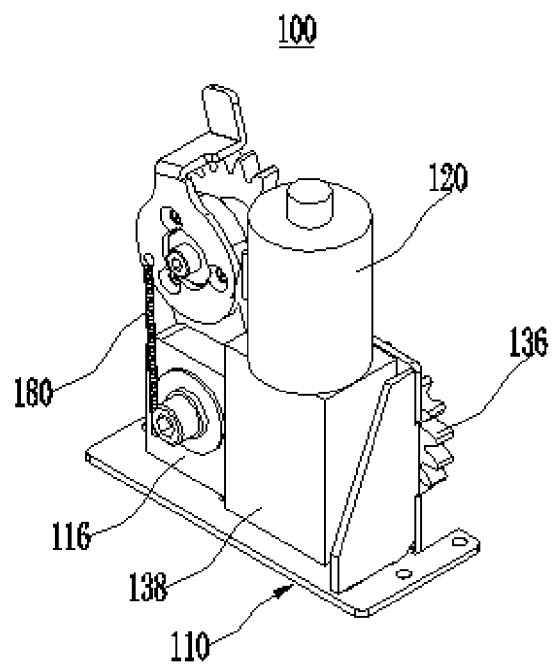
FIG. 3 is a structural view of a first driving mechanism of a bucket from a second angle of view according to an embodiment of the present disclosure.
Figure 4:
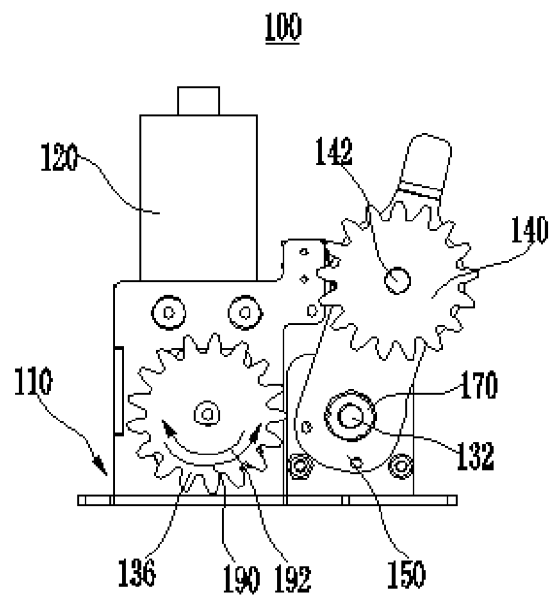
FIG. 4 is a structural view of a first driving mechanism of a bucket from a third angle of view according to an embodiment of the present disclosure.

The first driving mechanism 100 may be provided with different structural types as required. FIG. 2 is a structural diagram of the first driving mechanism 100 from a first angle of view according to an embodiment of the present disclosure; FIG. 3 is a structural diagram of the first driving mechanism 100 from a second angle of view according to an embodiment of the present disclosure; FIG. 4 is a structural diagram of the first driving mechanism 100 from a third angle of view according to an embodiment of the present disclosure. As shown in FIG. 2-FIG. 4, in the embodiment, the first driving mechanism 100 includes a base 110 at the bottom of the bucket body 210, a motor 120 on the base 110, a transmission mechanism 130 in transmission connection with the output shaft of the motor 120 and a power output wheel 140 in transmission connection with the transmission mechanism 130.

The transmission mechanism 130 is configured to drive the power output wheel 140 to rotate and to move from a first position to a second position when the output shaft of the motor 120 rotates in a first preset rotating direction 190; the transmission mechanism 130 is also configured to drive the power output wheel 140 to move from the second position to the first position when the output shaft of the motor 120 rotates in a second rotating preset direction 192; the first preset rotating direction 190 is opposite to the second preset rotating direction 192.

The base 110 may include a base plate 112, a vertical plate 114, and a mounting table 116. The edge of the base plate 112 is provided with at least two mounting holes 113 for mounting the driving mechanism 100 in the bucket body 210. The vertical plate 114 and the mounting table 116 are respectively connected to the base plate 112. In an embodiment, the vertical plate 114 is roughly rectangular and is formed by folding the base plate 112 upward, and the mounting table 116 is roughly rectangular and fixed on the upper surface of the base plate 112. The motor 120 is installed on the vertical plate 114.

Figure 5:
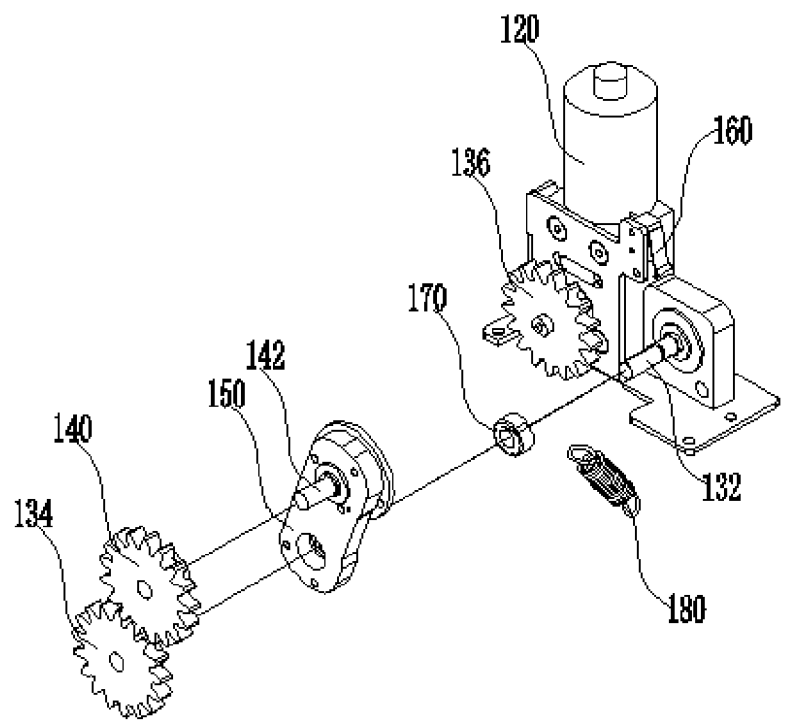
FIG. 5 is an explosive view of a first driving mechanism of a bucket according to an embodiment of the present disclosure.

FIG. 5 is an explosive view of the first driving mechanism 100 according to an embodiment of the present disclosure. As shown in FIG. 2 and FIG. 5, the transmission mechanism 130 includes a swing member 150, an intermediate transmission assembly 131 and a one-way transmission assembly 170.

The power output wheel 140 is rotationally arranged on the swing member 150; the output shaft of the motor 120 is in transmission connection with the power output wheel 140 through the intermediate transmission assembly 131, and the output shaft of the motor 120 is connected with the swing member 150 through the intermediate transmission assembly 131 and the one-way transmission assembly 170 in sequence. In an embodiment, the output shaft of the motor 120, the intermediate transmission assembly 131, the one-way transmission assembly 170 and the swing member 150 are connected in sequence.

When the output shaft of the motor 120 rotates in the first preset rotating direction 190, the one-way transmission assembly 170 is unlocked; namely, the transmission connection between the one-way transmission assembly 170 and the swing member 150 is broken; the power output from the output shaft of the motor 120 cannot be transmitted to the swing member 150 through the one-way transmission assembly 170, the swing member 150 swings in the forward direction under the action of external force to drive the power output wheel 140 to move from the first position to the second position, and the power of the motor 120 is transmitted to the power output wheel 140 through the intermediate transmission assembly 131 to rotate the power output wheel 140.

When the output shaft of the motor 120 rotates in the second preset rotating direction 192, the one-way transmission assembly 170 is locked; namely, the one-way transmission assembly 170 is in transmission connection with the swing member 150; the power output from the output shaft of the motor 120 is transmitted to the swing member 150 through the one-way transmission assembly 170, so that the swing member 150 swings in the reverse direction as driven by the motor 120, to drive the power output wheel 140 to move from the second position to the first position.

In the embodiment, the first position may be the position where the power output wheel 140 and the dispensing assembly of the storage column 320 are separated, and the second position may be the position where the power output wheel 140 is coupled with the dispensing assembly of the storage column 320; alternatively, in an embodiment, the first position may be the position where the power output wheel 140 is coupled with the dispensing assembly of the storage column 320, and the second position may be the position where the power output wheel 140 and the dispensing assembly of the storage column 320 are separated.

The swing member 150 may be set as strip-shaped and provided with arc-shaped structures at both ends. In an embodiment, the first driving mechanism 100 further includes an elastic member 180; the first end of the elastic member 180 is connected with the base 110, and the second end of the elastic member 180 is connected with the swing member 150; the elastic member 180 is configured to apply an elastic force to the swing member 150, so that the swing member 150 is always subject to a tendency to swing forward. The elastic member 180 may be provided with different structural types as required. In the embodiment, the elastic member 180 may be a tension spring. In an embodiment, the elastic member180 may also be an elastic rope or a torsion spring. The swing member 150 can be driven by an external force which may be of different types. In the embodiment, the swing member 150 tends to swing forward under the action of its own gravity. The external force may be the combined force of the gravity of the swing member 150 and the acting force of the elastic member 180. In an embodiment, the external may also be one of the gravity of the swing member 150 and the acting force of the elastic member 180.

The intermediate transmission assembly 131 may be provided with different structural types as required. In the embodiment, the intermediate transmission assembly 131 may include a first rotating shaft 132 and an intermediate transmission wheel 134 fixedly sleeved on the first rotating shaft 132; the first rotating shaft 132 may be rotationally arranged on the mounting table 116; the intermediate transmission wheel 134 is connected with the output shaft of the motor 120 and the power output wheel 140 at the same time. The intermediate transmission wheel 134 may be provided with different structural types as required. In the embodiment, the intermediate transmission wheel 134 may be a gear. In an embodiment, the intermediate transmission wheel 134 may also be a belt wheel.

In an embodiment, the intermediate transmission assembly 131 may further include a speed reducer 138 and a motor output wheel 136; the output shaft of the motor 120, the speed reducer 138, the motor output wheel 136 and the intermediate transmission wheel 134 are in transmission connection in sequence. In an embodiment, the speed reducer 138 is fixed on one side of the vertical plate 114; the output shaft of the motor 120 is fixedly connected with the input end of the speed reducer 138; the output end of the speed reducer 138 passes through the vertical plate 114 and is fixedly connected with the motor output wheel 136. The motor output wheel 136 may be provided with different structural types as required. In the embodiment, the motor output wheel 136 may be a gear for meshing with the intermediate transmission wheel 134. In an embodiment, the motor output wheel 136 may also be a belt wheel.

The one-way transmission assembly 170 may be provided with different structural types. In the embodiment, the one-way transmission assembly 170 includes a one-way bearing. The inner ring of the one-way bearing is sleeved on the first rotating shaft 132, and the outer ring of the one-way bearing is connected with the first end of the swing member 150. In an embodiment, the one-way transmission assembly 170 may also be provided with other structural types such as ratchet-pawl structural.

The power output wheel 140 is arranged at the second end of the swing member 150 away from the one-way bearing. In an embodiment, the second end of the swing member 150 is provided with a second rotating shaft 142; the power output wheel 140 is coupled with the second rotating shaft 142. The power output wheel 140 may be provided with different structural types as required. In the embodiment, the power output wheel 140 may be a gear for meshing with the intermediate transmission wheel 134.

The first driving mechanism 100 may further include a position detecting mechanism 160; the position detecting mechanism 160 is configured to detect whether the power output wheel 140 reaches the first position. When the position detecting mechanism 160 detects that the power output wheel 140 reaches the first position, the motor 120 stops rotating.

The working principle and process of the first driving mechanism 100 according to the embodiment are as follows.

When the first driving mechanism 100 does not need to output power, the power output wheel 140 is at the first position; the output shaft of the motor 120 does not rotate; the motor output wheel 136, the intermediate transmission wheel 134 and the power output wheel 140 are all still; the swing member 150 tends to swing forward under its own gravity and the action of the elastic member 180.

When the first driving mechanism 100 outputs power, the output shaft of the motor 120 rotates in the first preset rotating direction 190 to drive the motor output wheel 136 to rotate in the first preset rotating direction 190, and thus to drive the intermediate transmission wheel 134 to rotate in the second preset rotating direction 192, so that the power output wheel 140 can be driven to rotate. At the same time, the one-way transmission assembly 170 is unlocked, and the swing member 150 swings forward under its own gravity and the action of the elastic member 180 to drive the power output wheel 140 to move from the first position to the second position; at this point, the power output shaft 140 can couple with the dispensing assembly of the storage column 320, to provide power to the dispensing assembly for dispensing commodity.

When the first driving mechanism 100 stops outputting power, the output shaft of the motor 120 rotates in the second preset rotating direction 192 to drive the motor output wheel 136 to rotate in the second preset rotating direction 192, and thus to drive the intermediate transmission wheel 134 to rotate in the first preset rotating direction 190, so that the first rotating shaft 132 can rotate in the first preset rotating direction 190; at this point, since the one-way transmission assembly 170 is locked, the swing member 150 can swing reversely as driven by the first rotating shaft 132 so as to drive the power output wheel 140 to move from the second position to the first position; the motor 120 stops rotating when the power output wheel reaches the first position.

In the embodiment, the first preset rotating direction 190 is the counter-clockwise direction shown in FIG. 4, and the second preset rotating direction 192 is the clockwise direction shown in FIG. 4; The first position is the lifting position and the second position is the lowering position (i.e. the first position is higher than the second position). In an embodiment, for example, when the motor 120 is directly connected to the first rotating shaft 132, the first preset rotating direction 190 may also be the clockwise direction and the second preset rotating direction 192 may also be the counter-clockwise direction. When the first driving mechanism 100 is inverted at the top of the bucket body 210, the first position may also be the lowering position, and the second position may also be the lifting position (i.e., the first position is lower than the second position).

The first driving mechanism 100 can realize the rotation and movement of the power output wheel 140 at the same time through only one motor 120, and it is featured by simple structure and low manufacturing cost.

In an embodiment, the first driving mechanism 100 may also be provided with other structural types. For example, the first driving mechanism 100 may also include a base, a sliding base, a linear motor, a rotating motor and the power output wheel 140; the base is mounted at the bottom of the bucket body 210; the linear motor is fixed and mounted on the base; the sliding base is in sliding connection with the base in the second preset direction 240 and in transmission connection with the linear motor; the power output wheel 140 is mounted on the sliding base in such a manner that it can rotate around its axle; the rotating motor is fixed and mounted on the sliding base and in transmission connection with the power output wheel 140. When the first driving mechanism 100 outputs power, the linear motor drives the sliding base to move forward and thus to drive the power output wheel 140 to move forward, the rotating motor drives the power output wheel 140 to rotate at the same time, to provide power to the external device; when the first driving mechanism 100 stops outputting power, the linear motor drives the sliding base to move backward and thus to drive the power output wheel 140 to move backward; the rotating motor stops rotating and the power output wheel 140 stops rotating at the same time. The first driving mechanism 100 of the above structure can also realize the rotation and movement of the power output wheel 140, namely including two motors (linear motor and rotating motor).

The second driving mechanism 102 may also be provided with different structural types. In the embodiment, the structure of the second driving mechanism 102 is the same as that of the first driving mechanism 100; the first driving mechanism and the second driving mechanism are arranged on the two sides of the inner cavity 212 in the first preset direction 230; the first driving mechanism 100 and the second driving mechanism 102 are configured as being adjacent to the dispensing assembly of the storage column 320. In an embodiment, the structure of the second driving mechanism 102 may also differ from that of the first driving mechanism 100.

The bucket body 210 may also be arranged with a first detecting mechanism 101 and a second detecting mechanism 103; the first detecting mechanism 101 corresponds to the first driving mechanism 100 and is located below the first driving mechanism 100; the second detecting mechanism 103 corresponds to the second driving mechanism 102 and is located below the second driving mechanism 102. Both the first detecting mechanism 101 and the second detecting mechanism 103 are configured to detect the storage column 320; when the first detecting mechanism 101 detects the detecting unit arranged on the storage column 320, the first driving mechanism 100 is configured as being coupled with the dispensing assembly of the storage column 320 to provide power to the dispensing assembly; when the second detecting mechanism 103 detects the detecting unit on the storage column 320, the second driving mechanism 102 is configured as being coupled with the dispensing assembly of the storage column 320 to provide power to the dispensing assembly.

The bucket 200 is applied in vending machine, including a bucket body 210, a first driving mechanism 100 and a second driving mechanism 102; the bucket body 210 includes an inner cavity 212 and two ports 220 in communication with the inner cavity 212 respectively; the inner cavity 212 is configured to accommodate the commodities; the two ports 220 are arranged at an interval in a first preset direction 230; the first driving mechanism 100 and the second driving mechanism 102 are arranged at an interval in the bucket body 210 in a second preset direction 240, and are respectively configured to detachably mate with the dispensing assembly of the storage column 320 of the vending machine, to provide power to the dispensing assembly. Since the first driving mechanism 100 and the second driving mechanism 102 are arranged at an interval in the second preset direction 240, even if the bucket 200 cannot move to one of the two ends (namely the leftmost end and the rightmost end) in the second preset direction 240 inside the vending machine due to the structural constraint of the bucket 200, the first driving mechanism 100 or the second driving mechanism 102 can provide power to the dispensing assembly of the storage column 320 at the leftmost end or the rightmost end, effectively solving the problem of wasted internal space of the vending machine; and at the same time, it enables the storage column 320 at the rightmost end or the leftmost end to drive small commodity to enter the bucket 200, so as to improve the applicability and availability of the bucket 200 and to effectively make up for the defects of related technologies.

Figure 6:
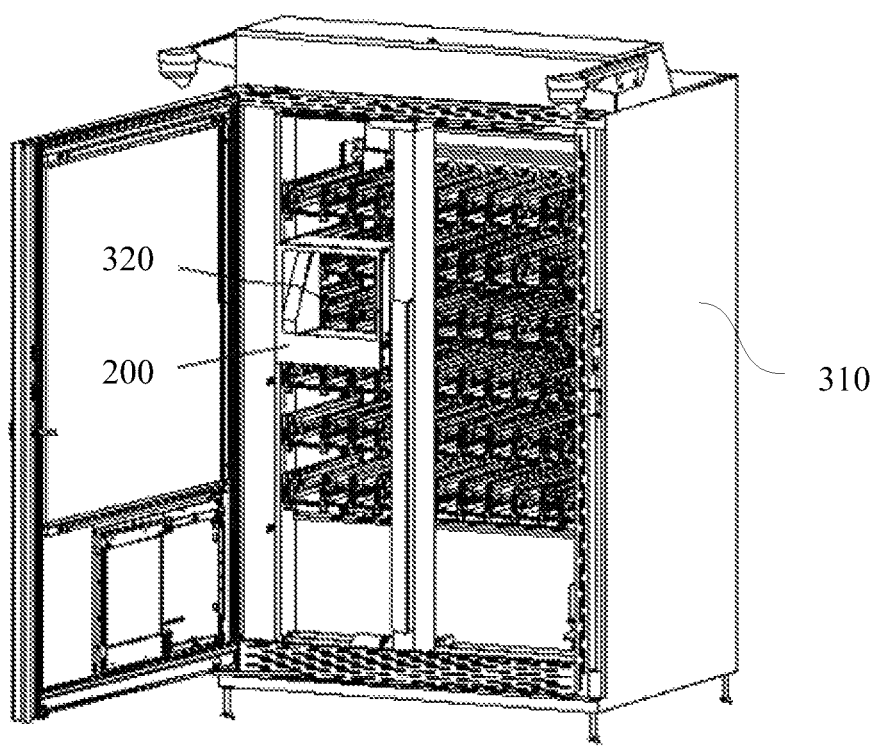
FIG. 6 is a structural view of a vending machine according to an embodiment of the present disclosure.

FIG. 6 is a structural diagram of the vending machine 300 according to an embodiment of the present disclosure. As shown in FIG. 6, the embodiment provides a vending machine 300 including a cabinet 310, multiple storage columns 320 and the above-mentioned bucket 200; the multiple storage columns 320 and the bucket 200 are arranged in the cabinet 310.

Among the two ports 220 of the bucket 200, the port 220 close to the storage columns 320 in the first preset direction 230 is an inlet; the inlet is arranged to be opposite to any one of storage columns 320 by the movement of the bucket 200, so that the first driving mechanism 100 or the second driving mechanism 102 of the bucket 200 is configured as being coupled with the dispensing assembly of the storage column 320 that the inlet is opposite to for transmission, providing power to the dispensing assembly and driving the dispensing assembly to output the commodity in the storage column 320.

The vending machine 300 provided with the above-mentioned bucket 200 can make full use of the leftmost or rightmost internal space to avoid waste of the internal space; and at the same time enable the storage column 320 at the rightmost end or the leftmost end to convey the small commodity, so as to effectively improve the capability of storing and conveying commodity and to make up for the defects of related technologies.

What is claimed is:

1. A bucket for a vending machine, comprising a bucket body, a first driving mechanism and a second driving mechanism;

wherein the bucket body comprises an inner cavity and two ports in communication with the inner cavity respectively; the two ports are arranged at an interval in a first preset direction;

wherein the first driving mechanism and the second driving mechanism are spaced apart from each other in the bucket body in a second preset direction, and are respectively configured to detachably mate with a dispensing assembly of a storage column of the vending machine, to provide power to the dispensing assembly;

wherein the first preset direction and the second preset direction are arranged with an included angle;

wherein at least one among the first driving mechanism and the second driving mechanism comprises: a base arranged in the bucket body, a motor arranged on the base, a transmission mechanism in transmission connection with an output shaft of the motor and a power output wheel in transmission connection with the transmission mechanism;

wherein, the transmission mechanism is configured to drive the power output wheel to rotate and move from a first position to a second position when the output shaft of the motor rotates in a first preset rotating direction; the transmission mechanism is further configured to drive the power output wheel to move from the second position to the first position when the output shaft of the motor rotates in a second preset rotating direction; the first preset rotating direction is opposite to the second preset rotating direction;

wherein the transmission mechanism comprises a swing member, an intermediate transmission assembly and a one-way transmission assembly;

the power output wheel is rotationally arranged on the swing member; the output shaft of the motor is in transmission connection with the power output wheel through the intermediate transmission assembly; and the output shaft of the motor is connected with the swing member through the one-way transmission assembly;

when the output shaft of the motor rotates in the first preset rotating direction, the one-way transmission assembly is configured to be unlocked, the swing member is configured to swing in a forward direction under an action of external force to drive the power output wheel to move from the first position to the second position, and power of the motor is configured to be transmitted to the power output wheel through the intermediate transmission assembly to rotate the power output wheel; and when the output shaft of the motor rotates in the second preset rotating direction, the one-way transmission assembly is configured to be locked, the power of the motor is configured to be transmitted to the swing member through the one-way transmission assembly, so that the swing member swings in a reverse direction under drive of the motor, to drive the power output wheel move from the second position to the first position.

2. The bucket according to claim 1, wherein the bucket body further comprises a first detecting mechanism and a second detecting mechanism, wherein the first detecting mechanism corresponds to the first driving mechanism, and the second detecting mechanism corresponds to the second driving mechanism, wherein both the first detecting mechanism and the second detecting mechanism are configured to detect the storage column, wherein when the first detecting mechanism detects a detecting unit arranged on the storage column, the first driving mechanism is configured as being coupled with the dispensing assembly of the storage column, wherein when the second detecting mechanism detects the detecting unit on the storage column, the second driving mechanism is configured as being coupled with the dispensing assembly of the storage column.

3. The bucket according to claim 1, wherein the first driving mechanism and the second driving mechanism are arranged on two sides of the inner cavity respectively.

4. The bucket according to claim 1, wherein a structure of the first driving mechanism is the same as a structure of the second driving mechanism.

5. The bucket according to claim 1, wherein the output shaft of the motor is connected with the swing member through the one-way transmission assembly, and the output shaft of the motor, the intermediate transmission assembly, the one-way transmission assembly and the swing member are connected in turn.

6. The bucket according to claim 1, wherein the one-way transmission assembly comprises a one-way bearing.

7. The bucket according to claim 6, wherein the intermediate transmission assembly comprises a first rotating shaft and an intermediate transmission wheel fixedly sleeved on the first rotating shaft, wherein the first rotating shaft is rotationally arranged on the base, wherein an inner ring of the one-way bearing is sleeved on the first rotating shaft, wherein an outer ring of the one-way bearing is connected with the swing member, wherein the intermediate transmission wheel is in transmission connection with the output shaft of the motor and the power output wheel at the same time.

8. The bucket according to claim 1, wherein the bucket further comprises an elastic member, wherein a first end of the elastic member is connected with the base, and a second end of the elastic member is connected with the swing member, wherein the external force is one of the following:
    a gravity of the swing member;
    an acting force of the elastic member; and
    a combined force of a dead weight of the swing member and an acting force of the elastic member.

9. A vending machine, comprising multiple storage columns and a bucket;
    wherein the bucket comprises a bucket body, a first driving mechanism and a second driving mechanism;
    wherein the bucket body comprises an inner cavity and two ports in communication with the inner cavity respectively; the two ports are arranged at an interval in a first preset direction;
    wherein the first driving mechanism and the second driving mechanism are spaced apart from each other in the bucket body in a second preset direction, and are respectively configured to detachably mate with a dispensing assembly of a storage column among the multiple storage columns of the vending machine, to provide power to the dispensing assembly;
    wherein the first preset direction and the second preset direction are arranged with an included angle;
    wherein at least one among the first driving mechanism and the second driving mechanism comprises: a base arranged in the bucket body, a motor arranged on the base, a transmission mechanism in transmission connection with an output shaft of the motor and a power output wheel in transmission connection with the transmission mechanism;
    wherein, the transmission mechanism is configured to drive the power output wheel to rotate and move from a first position to a second position when the output shaft of the motor rotates in a first preset rotating direction; the transmission mechanism is further configured to drive the power output wheel to move from the second position to the first position when the output shaft of the motor rotates in a second preset rotating direction; the first preset rotating direction is opposite to the second preset rotating direction;
    wherein the transmission mechanism comprises a swing member, an intermediate transmission assembly and a one-way transmission assembly;
    the power output wheel is rotationally arranged on the swing member; the output shaft of the motor is in transmission connection with the power output wheel through the intermediate transmission assembly; and the output shaft of the motor is connected with the swing member through the one-way transmission assembly;
    when the output shaft of the motor rotates in the first preset rotating direction, the one-way transmission assembly is configured to be unlocked, the swing member is configured to swing in a forward direction under an action of external force to drive the power output wheel to move from the first position to the second position, and power of the motor is configured to be transmitted to the power output wheel through the intermediate transmission assembly to rotate the power output wheel;
    when the output shaft of the motor rotates in the second preset rotating direction, the one-way transmission assembly is configured to be locked, the power of the motor is configured to be transmitted to the swing member through the one-way transmission assembly, so that the swing member swings in a reverse direction under drive of the motor, to drive the power output wheel move from the second position to the first position;
    wherein among the two ports of the bucket, one close to the multiple storage columns in the first preset direction is an inlet; the inlet is arranged to be opposite to any one of the multiple storage columns by a movement of the bucket, so that the first driving mechanism or the second driving mechanism of the bucket is configured as being coupled with the dispensing assembly of a storage column that is among the multiple storage columns and is opposite to the inlet, providing power to the dispensing assembly.

10. The bucket according to claim 2, wherein the first driving mechanism and the second driving mechanism are arranged on two sides of the inner cavity respectively.

11. The bucket according to claim 2, wherein a structure of the first driving mechanism is the same as a structure of the second driving mechanism.

12. The bucket according to claim 3, wherein a structure of the first driving mechanism is the same as a structure of the second driving mechanism.

13. The bucket according to claim 5, wherein the one-way transmission assembly comprises a one-way bearing.

* * * * *